Figure 1:
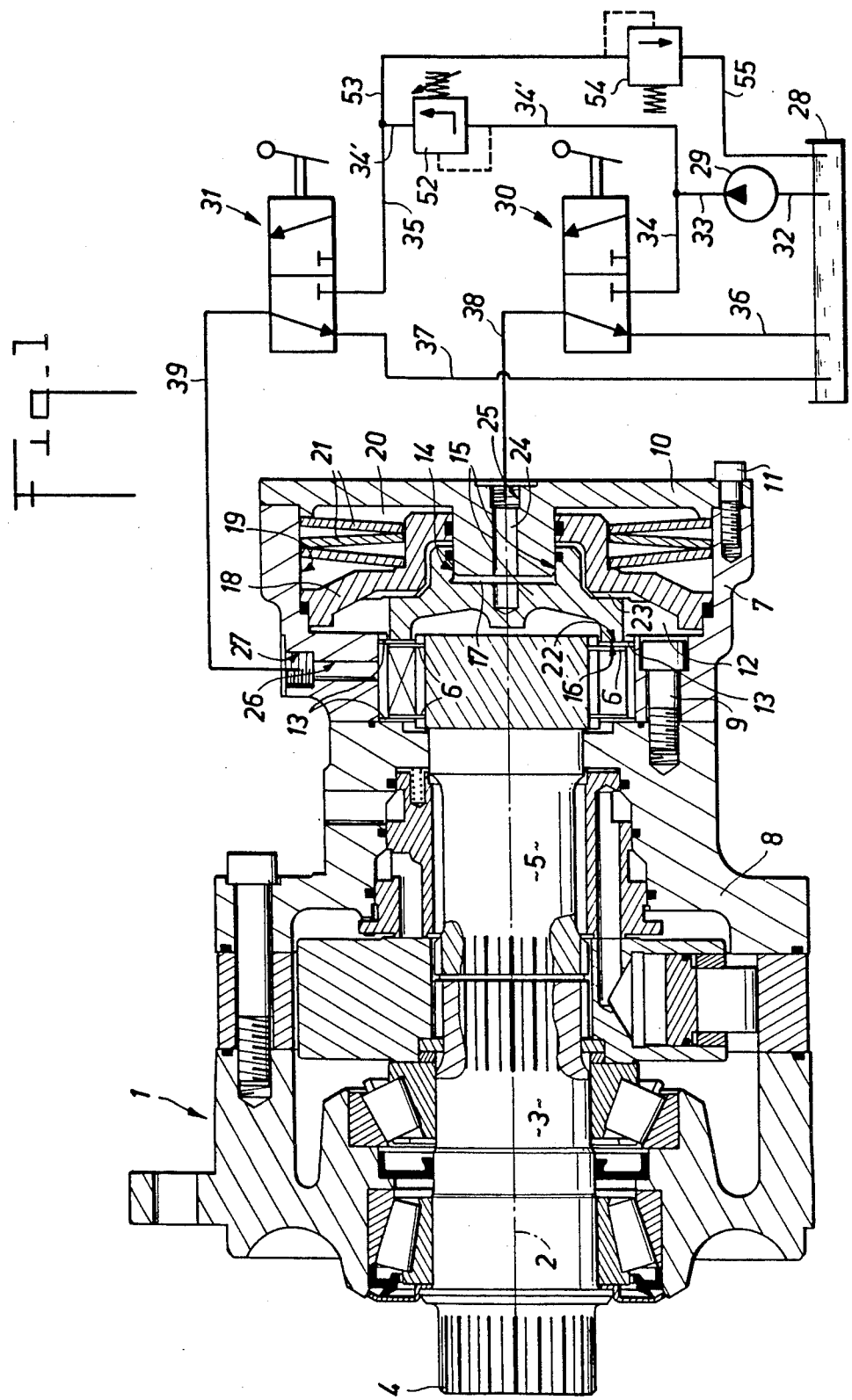

United States Patent [19]

Lallier

[11] Patent Number: 4,723,636
[45] Date of Patent: Feb. 9, 1988

[54] BRAKING DEVICE WITH MULTIPLE EFFECTS

[75] Inventor: Jean-Claude Lallier, Crepy en Valois, France

[73] Assignee: Societe Anonyme: Poclain Hydraulics, Verberie, France

[21] Appl. No.: 893,036

[22] Filed: Aug. 1, 1986

[30] Foreign Application Priority Data

Aug. 5, 1985 [FR] France ............................... 85 11960

[51] Int. Cl.$^4$ ............................................. F16D 65/04
[52] U.S. Cl. ..................................... 188/170; 188/72.1
[58] Field of Search ................... 188/170, 72.1, 160 F

[56] References Cited

U.S. PATENT DOCUMENTS

| | | | |
|---|---|---|---|
| 3,010,542 | 11/1961 | Graber | 188/71.9 X |
| 3,946,837 | 3/1976 | Houser . | |
| 3,974,896 | 8/1976 | Rach . | |
| 4,023,654 | 3/1977 | Wiszeler | 188/170 |
| 4,173,269 | 11/1979 | Craig | 188/71.5 |
| 4,491,202 | 1/1985 | Schmitt | 188/170 X |

FOREIGN PATENT DOCUMENTS

| | | |
|---|---|---|
| 2535254 | 5/1984 | France . |
| 2537519 | 6/1984 | France . |
| 8303124 | 9/1983 | PCT Int'l Appl. . |
| 2104986 | 3/1983 | United Kingdom . |

Primary Examiner—Joseph Falk
Attorney, Agent, or Firm—Curtis, Morris & Safford

[57] ABSTRACT

The invention relates to a braking device, constituted by a housing in which is housed a brake disc fixed in rotation with respect to the housing, a shaft mounted to rotate, a rotary brake disc, fast with the shaft, a first jack, constituting a pressurized fluid braking control member, and a second jack distinct and independent of the first jack, which defines, inside the housing, a brake-release chamber, to which is coupled an elastic safety braking member, the mobile element of the first jack and the piston of the second jack being stacked axially in that order from only one of the two ends of the alternate stack of the fixed and rotary brake discs. The mobile elements of the two jacks are each at least partly contained in the brake-release chamber which, furthermore, contains each fixed brake disc and 1 or each rotary brake disc. One application of the present invention is a multiple-effect brake of satisfactory compactness.

4 Claims, 3 Drawing Figures

BRAKING DEVICE WITH MULTIPLE EFFECTS

The present invention relates to a braking device with multiple effects.

Braking devices presenting several functions, such as parking and emergency braking, release of the safety brake and service braking, already exist.

A braking device with multiple effects—These effects include: (1) parking and emergency braking via an elastic return member, (2) service braking by pressurized fluid control, and (3) release of the brake by pressurized fluid control. To accomplish these multiple effects, the braking device of the present invention includes a housing in which are housed at least one brake disc fixed in rotation with respect to the housing, a shaft mounted to rotate with respect to the housing and fast with, or forming part of a body having to be braked, at least one rotary brake disc. This braking device includes fast in rotation with the shaft and adapted to be placed in contact with or, on the contrary, moved apart from the fixed disc, a first jack of which the element axially mobile inside the housing constitutes the member controlling the pressurized fluid braking, and a second jack having a piston which is distinct and independent of the mobile element of the first jack, which defines, inside the housing, a brake-release chamber and to which is coupled said elastic return member of the parking and emergency braking, the mobile element of the first jack and the piston of the second jack being stacked axially in that order from one only of the two ends of the alternate stack of the fixed and rotary brake discs.

However, this arrangement may present drawbacks, including the obligation to control the brake-release piston by a high pressure fluid, this piston generally being relatively small. Moreover, the various chambers and enclosures are separate, which generally leads to:

considerable longitudinal dimensions;

an arrangement of the connections of the control fluid ducts which, not grouped in the same zone, also present non-optimalized dimensions.

It is an object of the present invention to overcome these drawbacks by proposing a novel arrangement adapted to a braking device as defined hereinbefore.

To this end, according to the invention, the mobile elements of the two jacks are each at least partly contained in the brake-release chamber which, furthermore, contains each fixed brake disc and 1 or each rotary brake disc.

The following advantageous arrangements are also preferably adopted:

the mobile element of the first jack is entirely contained in the brake-release chamber;

the mobile element of the first jack is alone capable of transmitting to said stack of discs the braking thrust of the elastic return member of the parking and emergency braking and/or the thrust of the first pressurized fluid braking jack, the piston of the second jack being, in the configuration of parking and emergency braking, in thrust abutment on said mobile element of the first jack which transmits this thrust to the discs of the stack of discs;

or the mobile element of the first jack has a face defining it which is oriented towards the face for abutment of said sole end of the stack of the discs and of which at least one part is constituted by a piston coaxial to the axis of the shaft and mounted to slide inside a discharge chamber without fluid pressure made in one end of the shaft and isolated from said brake-release chamber.

Figure 2:
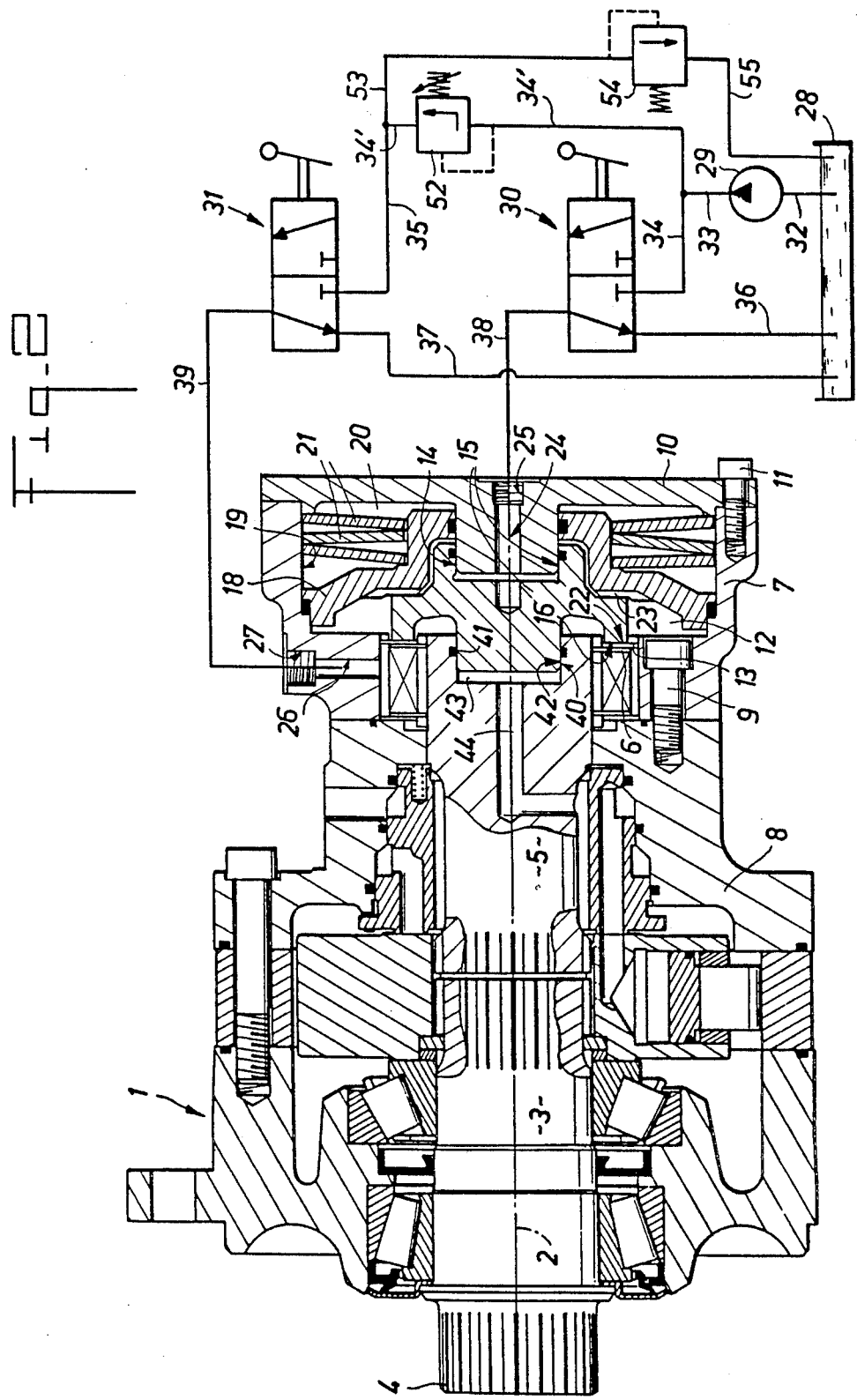
Figure 3:
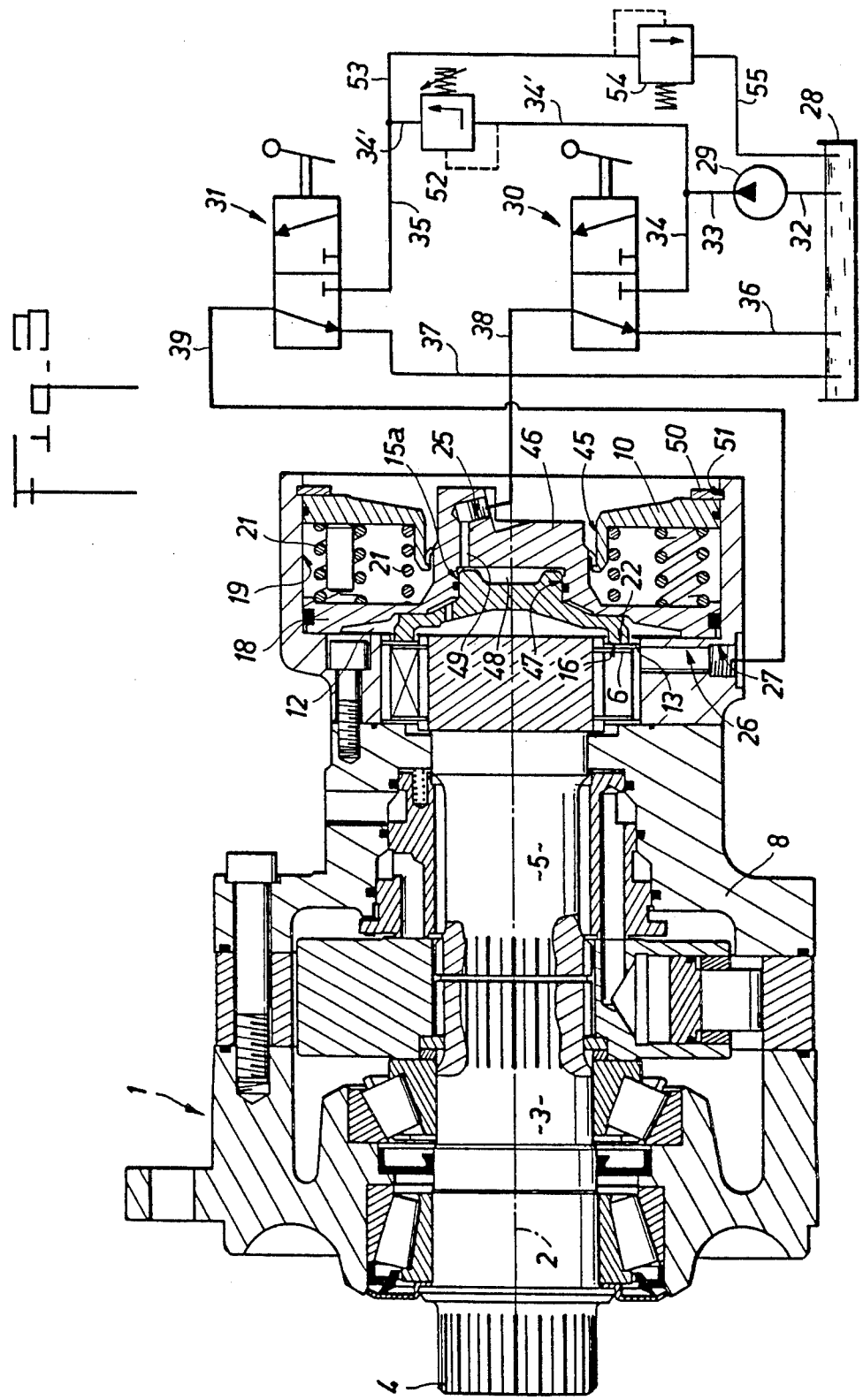

The invention will be more readily understood on reading the following description with reference to the accompanying drawings, in which:

FIGS. 1, 2 and 3 are axial sections of three illustrative embodiments of the present invention.

Referring now to the drawings, the assembly shown in FIG. 1 is constituted by:

a hydraulic motor 1 presenting two output shafts mounted to rotate about the same geometrical axis of rotation 2: the drive shaft 3 proper, provided with outer fluting 4 allowing a given body (wheel, endless tracks, etc. . . . ) to be driven in rotation, and a so-called brake shaft 5 with which rotary brake discs 6 rotate in unison;

a housing 7 which is fixed on the housing 8 of the motor 1 by screws 9 and which comprises a closure lid 10 fastened by screws 11, the whole forming a closed enclosure 12;

brake discs 13, fixed in rotation, which are fast in rotation with the housing 7 and are interposed between the rotary discs 6.

One end of the brake shaft 5 and the stack of the fixed discs 13 and the rotary brake discs 6, are contained in the enclosure 12.

A cylindrical protuberance on lid 10 projects inside the enclosure 12 and constitutes the piston 14 of a first jack of which the cylinder 15 is in abutment by a ring 16 on a fixed disc 13 forming one end 22 of the stack of discs. A braking chamber 17 is formed between the bottom of the cylinder 15 and the piston 14.

Furthermore, the piston 18 of a second jack is mounted to slide inside a bore 19 which the housing 7 comprises and also with respect to piston 14 of the first jack, forming inside said housing 7 a brake-release chamber which merges with that part of the enclosure 12 containing the stack of discs, and another chamber 20 containing a spring 21 constituted by elastic washers.

It should be noted that, from end 22 of the stack of discs, the cylinder 15 of the first jack and the piston 18 of the second jack succeed each other axially in that order. Furthermore, in the embodiment of FIG. 1, as well as in those of the other two Figures, only cylinder 15 is capable of being in abutment with end 22. Finally, the piston 18 of the second jack has its face defining the brake-release chamber 12, provided with ribs 23, which allow this piston 18 to abut on that face of the cylinder 15 of the first jack opposite the ring 16 as well as the establishment of the pressure of the chamber 12 between piston 18 and cylinder 15 up to the diameter of piston 14.

A duct 24, made in the lid 10 and in the piston 14 of the first jack, connects the braking chamber 17 to a branch socket 25. Similarly, a duct 26, made in the wall of the housing 7, connects the brake-release chamber 12 to another branch socket 27.

The hydraulic control circuit of the first and second jacks is constituted by:

a fluid reservoir 28;

a pump 29;

a first two-way fluid distributor 30;

a second two-way fluid distributor 31;

the suction, conduit 32 of the pump 29, connecting the latter to reservoir 28;

the delivery conduit 33 of pump 29;

conduits 34, 34' connecting this delivery conduit 33 of pump 29 to the first fluid distributor 30 and to a controlled calibration valve 52, disposed in conduit 34', respectively;

conduits 35 and 53 connecting the controlled calibration valve 52 to the second fluid distributor 31 and to a pre-calibrated valve 54, respectively;

a conduit 55 connecting the pre-calibrated valve 54 to the reservoir 28;

conduits 36, 37 connecting the first and second distributors respectively to reservoir 28;

a conduit 38 connects the first distributor 30 to the socket 25 of conduit 24, and a conduit 39 connects the second distributor 31 to socket 27 of conduit 26.

The two positions of the first distributor 30 correspond:

the first position, to the communication of conduits 38 and 36 and to the obturation of conduit 34, and the second position, to the communication of conduits 34 and 38, and to the obturation of conduit 36.

The two positions of the second distributor 31 correspond:

the first position, to the communication of conduits 39 and 37, and to the obturation of conduit 35, and the second position, to the communication of conduits 35 and 39 and to the obturation of conduit 37.

The controlled calibration valve 52 makes it possible to vary the pressure of conduits 33, 34, 34' independently of the pressure prevailing in conduit 35.

The pre-calibrated valve 54 makes available a constant pressure in conduits 35 and 53.

The braking device of FIG. 2 has the same constitution as that of FIG. 1 and may therefore be defined by the above description unchanged with, in addition, the following additional arrangement: the central part of the cylinder 15 of the first jack comprises a projection, itself forming a piston 40, which slides with seal (41) inside a bore 42 made in the end of the shaft 5 contained in the brake-release chamber 12. A chamber 43 is thus defined by the piston 40 and the bore 42, forming cylinder and communicates with the interior of the housing 8 of motor 1 by a duct 44. In the present case, the pressure prevailing in the housing 8 of the motor is low or zero.

FIG. 3 is an axial section of a third embodiment, similar to that of FIG. 1, in which the same reference numerals designate the corresponding elements in the two Figures. The main differences are as follows:

lid 10 no longer comprises piston 14, but, on the contrary, presents at its centre an opening 45 for the passage of a protuberance 46 of the piston 18 of the second jack;

the cylinder of the first jack is replaced by a piston 15a, which slides inside a bore 47 made in piston 18 and opening out in the face of this piston defining the brake-release chamber 12;

a braking chamber 48 is defined by piston 15a, bore 47 and its bottom, and is connected by a conduit 49 to socket 25;

lid 10 is maintained in position by means of a stop washer 50 introduced into a groove 51 made in bore 19;

spring 21 is constituted by coil compression springs;

ring 16 forms part of piston 15a.

In each of the embodiments described, it will also have been noted that the cross section of the piston (14, 15a) of the first jack is appreciably smaller than that of piston 18 of the second jack: in these embodiments, a ratio of the order of 1/16 is ascertained between these cross sections.

Finally, the hydraulic circuit shown presents one single pump furnishing the fluid for controlling braking and the fluid for controlling brake-release. In the present case, it is more a question of convenience of representation—the circuit shown operating satisfactorily—, than of the faithful representation of the circuit generally adopted at the present time. In fact, in this latter type of circuit, the brake-release fluid (chamber 12) is often constituted by a fluid having already worked in a principal circuit, other than the braking circuit, and which, consequently, is generally at low pressure (of the order of 20 to 30 bars) and presents considerable fluctuations (up to 30% of the average value of its pressure) of its pressure. On the contrary, the braking fluid (chamber 17; 48) is a high pressure fluid (150 bars, or even more), most often regulated, thereore having low-amplitude pressure oscillations.

Each embodiment shown presents three possible operations:

A parking and emergency braking is firstly obtained when, the first and second distributors 30, 31 being placed in their respective first positions, the brake-release chamber 12 and braking chambers (17, 48) contain a fluid without pressure. Spring 21 acts alone, pushes piston 18 of the second jack in the direction resulting in a reduction in the volume of the brake-release chamber 12. Piston 18 pushes cylinder 15 of FIGS. 1 and 2, or piston 15a of FIG. 3, which provokes abutment of ring 16 on the end 22 of the stack of discs and finally, braking of shafts 5 and 3.

It is, of course, necessary to be able to allow shafts 3 and 5 to rotate freely without braking. The placing of the first distributor 30 in its first position and of the second distributor 31 in its second position enable the brake-release fluid to arrive in the brake-release chamber 12 and to act on a section of piston equal either to that of the large piston 18 of the second jack (FIGS. 1 and 3) or to the preceding one, decreased by that of piston 40 (FIG. 2), and this in the sense of increasing the volume of the brake-release chamber 12, i.e. in the sense of stopping the braking thrust on the discs. The force of the pressure of the brake-release fluid is naturally greater than that of spring 21, with the result that brake-release is effectively obtained. It should be noted that, in the embodiment of FIG. 2, the section of piston 40 is substantially equal to that of piston 14.

A service braking is obtained from the free position, without the braking described hereinabove, by placing the first distributor 30 in its second position, the second distibutor 31 remaining in its second position, and by modulating the pressure of the pump 29 via the controlled calibration valve 52 in the braking chamber (17, 48), in order thus to obtain a compression thrust of the stack of discs by cylinder 15, or piston 15a and, finally, to obtain a hydraulic braking.

In addition to the obtaining of the three operations mentioned above, the following particular features should be noted:

the section of the braking piston 14, 15a is small with respect to that of the brake-release piston 18, this enabling a rapid hydraulic braking and rapid, effectively desired reactions, to be obtained;

the fact that the braking pistons 14, 15a and brake-release piston 18 are constituted by totally independent parts further makes it possible, at the moment of hydraulic braking, to limit the antagonistic effect of the pressure of the fluid still contained in the brake-release chamber 12 solely by the effect of this fluid on the (small) section of the braking piston(14, 15a);

on the contrary, the brake-release fluid acting on the whole section of the piston 18 of the second jack, possibly slightly reduced (viz. on a section equal to 15/16ths of the preceding one), i.e. on a large section, may effect brake-release even if its pressure is low;

in the embodiment of FIG. 2, the pressure acting in the chamber 43 is low or zero, this making it possible to render the braking effort proportional to the supply pressure whatever the pressure in the chamber 12;

when the pressures in the braking chambers 17, 48 and brake-release chamber 12 are appreciably different, and in addition when that in the brake-release chamber is much lower (20 to 30 bars) than those of the braking chamber (150 bars) and subjected to high-amplitude oscillations, the braking fluid still acts satisfactorily as, at worst, the variation in effective braking pressure is 10 bars (30−20 bars) on a minimum value of 120 bars (150−30 bars), therefore low in relative value (1/12); this result is in connection with the choice of the stack of the first (14, 15a) and second (18) pistons;

in the embodiments of FIGS. 1 and 3, the brake-release fluid admitted into chamber 12 acts in addition on the cylinder 15 or the piston 15a of the first jack in the sense of moving it away from the end 22 of the stack, thus avoiding the ring 16 continuing to sweep said end 22 and therefore avoiding the maintaining of a residual braking and premature wear of the brake discs; this result is enhanced by the cylinder 15 or piston 15a being contained in the brake-release chamber 12 and therefore subjected to the action of the brake-release fluid;

the intricated arrangement of the cylinder 15 or piston 15a of the first jack and of the piston 18 of the second jack further allows good compactness of the braking device to be obtained, as well as an arrangement of sockets 25 and 27 which facilitates the formation of the hydraulic circuit.

It must be noted that, although in the embodiments described, only the ring 16 is capable of being in abutment with end 22 of the stack of discs, it would also be possible, in another embodiment, to provide the abutment of piston 18 of the second jack with said end 22, simultaneously to the abutment of ring 16 with the end 22.

The invention is not limited to the embodiments described, but covers, on the contrary, all variants which may be made thereto without departing from their scope nor their spirit.

What is claimed is:

1. A braking device with multiple effects of parking and emergency braking via an elastic return member, service braking by pressurized fluid control, and release of the brake by pressurized fluid control comprising:
   a housing having at least one brake disc fixed in rotation therewith,
   a shaft mounted to rotate with respect to the housing and forming part of a body having to be braked,
   at least one rotary brake disc, fast in rotation with the shaft connected to the housing and engageable with the fixed disc, each said fixed disc being interposed adjacent to the at least one rotary brake disc,
   at least one source of pressurized fluid,
   at least one reservoir of non-pressurized fluid,
   a first jack of which the element axially movable inside the housing defines the member controlling the pressurized braking fluid, and is connected to a source of pressurized fluid via a first fluid pipe,
   a first fluid distributor interposed on said first fluid pipe, said first fluid distributor separating the first fluid pipe into a first section connnected to the first jack and a second section connected to the source of pressurized fluid,
   a second fluid pipe connecting the first distributor to a reservoir of non-pressurized fluid, said first distributor having at least two positions, a first position which causes the first and second sections of the first pipe to communicate with one another, and a second position which causes the first section to communicate with the second pipe,
   a second jack having a piston which is separate and independent of the movable element of the first jack, which defines, inside the housing, a brake-release chamber and to which is coupled said elastic return means of the parking and emergency braking, the effect of which is opposite to that of the prssure of the fluid which may be contained in the brake-release chamber,
   a third fluid pipe,
   a second fluid distributor interposed on said third pipe, said second fluid distributor separating the third pipe into a first portion connected to the brake-release chamber and a second portion connected to the source of pressurized fluid,
   a fourth pipe connected the second distributor to a reservoir of non-pressurized fluid, said second distributor having at least two positions, a first position which causes the first and second portions of the third pipe to communicate with one another and a second position which causes the first portion of the third pipe to communicate with the fourth pipe, and
   the movable element of the first jack and the piston of the second jack being stacked axially in that order from only one of the two ends of the alternate stack of the fixed and rotary brake discs, the movable elements of the two jacks are each at least partly contained in the brake-release chamber which, contains each fixed brake disc and each rotary brake disc.

2. The braking device of claim 1, wherein the movable element of the first jack is entirely contained in the brake-release chamber.

3. The braking device of either one of claim 1, wherein the movable element of the first jack is alone capable of transmitting to said stack of discs the braking thrust of the elastic return member of the parking and emergency braking and/or the thrust of the first pressurized fluid braking jack, the piston of the second jack being, in the configuration of parking and emergency braking, in thrust abutment on said movable element of the first jack which transmits this thrust to the discs of the stack of discs.

4. The braking device of either one of claim 1, wherein the movable element of the first jack has a face defining it which is oriented towards the face for abutment of said sole end of the stack of the dsics and of which at least one part is constituted by a piston coaxial to the axis of the shaft and mounted to slide inside a discharge chamber without fluid pressure made in one end of the shaft and isolated from said brake-release chamber.

* * * * *